US012601244B2

(12) United States Patent
Cook et al.

(10) Patent No.: US 12,601,244 B2
(45) Date of Patent: Apr. 14, 2026

(54) FLEXIBLE PIPE CONNECTION SYSTEMS AND METHODS

(71) Applicant: FMC Technologies, Inc., Houston, TX (US)

(72) Inventors: James Cook, Houston, TX (US); Corey Massey, Houston, TX (US); John Eden, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 76 days.

(21) Appl. No.: 17/982,286

(22) Filed: Nov. 7, 2022

(65) Prior Publication Data

US 2023/0053422 A1 Feb. 23, 2023

Related U.S. Application Data

(63) Continuation-in-part of application No. 17/315,065, filed on May 7, 2021, now Pat. No. 11,549,627.

(51) Int. Cl.
E21B 43/26 (2006.01)
F16L 27/10 (2006.01)
F16L 57/02 (2006.01)

(52) U.S. Cl.
CPC .......... E21B 43/2607 (2020.05); F16L 27/10 (2013.01); F16L 57/02 (2013.01)

(58) Field of Classification Search
CPC ... F16L 41/03; F16L 9/22; F16L 11/18; F16L 3/015; E21B 43/26; E21B 43/2607; E21B 17/20
See application file for complete search history.

(56) References Cited

U.S. PATENT DOCUMENTS

| | | | | |
|---|---|---|---|---|
| 2005/0056333 A1* | 3/2005 | Utaki | ...................... | F16L 3/015 |
| | | | | 138/155 |
| 2021/0372548 A1* | 12/2021 | Post | ................... | E21B 43/2607 |
| 2022/0018235 A1* | 1/2022 | Post | ................... | E21B 43/2607 |

OTHER PUBLICATIONS

Office Action issued in United Arab Emirates Application No. P6002871/2023, mailed on Apr. 29, 2025 (8 pages).
Office Action issued in Saudi Arabian Application No. 123450288, mailed on Jul. 28, 2025 (14 pages).

* cited by examiner

*Primary Examiner* — Reinaldo Sanchez-Medina
*Assistant Examiner* — Nicole Gardner
(74) *Attorney, Agent, or Firm* — Osha Bergman Watanabe & Burton LLP

(57) ABSTRACT

A system may a first frac tree having a first inlet, a manifold having a first fluid outlet, and a first flexible pipe. The first flexible pipe may include a first end of the first flexible pipe coupled to the first fluid outlet; a second end of the first flexible pipe is coupled to the first inlet; and a first outer shell rotationally mounted on the manifold, the first outer shell extends from the manifold a length between the first end and the second end. The first outer shell may extend from the manifold a length between the first end and the second end. Additionally, the first outer shell is curved to have a radius to arch the first flexible pipe from the manifold to the frac tree.

17 Claims, 9 Drawing Sheets

*200*

FLEXIBLE PIPE CONNECTION SYSTEMS AND METHODS

BACKGROUND

In a well fracture system, high pressure fluids must be transmitted to a wellbore. Systems for generating sufficient pressure are complex and generally involve distributing low pressure fluid from a manifold, also referred to as a missile, to one or more pump trucks through low pressure lines. The pump trucks pressurize the fluid and return the high-pressure fluid to the manifold through high pressure lines. The high-pressure fluid is delivered to one or more wellbores for use in downhole operations such as fracturing.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the present disclosure relates to a system that may include a first frac tree having a first inlet; a manifold having a first fluid outlet; and a first flexible pipe. The first flexible pipe may include a first end of the first flexible pipe coupled to the first fluid outlet; a second end of the first flexible pipe is coupled to the first inlet; and a first outer shell rotationally mounted on the manifold, the first outer shell extends from the manifold a length between the first end and the second end. The first outer shell may be curved to have a radius to arch the first flexible pipe from the manifold to the frac tree.

In another aspect, the present disclosure relates to a system to deliver pressurized fluid to one or more frac trees. The system may include a first pump truck having a first pump disposed thereon, the first pump may include a first fluid outlet; a manifold having a second fluid outlet and a plurality of fluid inlets, the first fluid outlet of the first pump is fluidly connected to a first inlet of the plurality of fluid inlets; and a first flexible pipe. The first flexible pipe may include a first end of the first flexible pipe coupled to the second fluid outlet of the manifold; a second end of the first flexible pipe is coupled to a fluid inlet of a first frac tree; and a first outer shell mounted on the manifold, the first outer shell extends from the manifold a length between the first end and the second end. The first outer shell may be curved to have a radius to arch the first flexible pipe from the manifold to the first frac tree.

In yet another aspect, the present disclosure relates to a method for fluidly connecting a manifold to at least two frac trees. The method may include rotationally mounting an outer shell of a flexible pipe to a structure attached to the manifold; fluidly connecting a first end of the flexible pipe to a fluid outlet of the manifold; hanging a second end of the flexible pipe a distance from the structure thereby forming the flexible pipe in a self-supporting arch; fluidly connecting the second end of the flexible pipe to a first fluid inlet of a first frac tree of the at least two frac trees; and switching the second end of the flexible pipe from the first fluid inlet of the first frac tree to fluidly connect to a second fluid inlet of a second frac tree of the at least two frac trees.

Other aspects and advantages will be apparent from the following description and the appended claims.

DETAILED DESCRIPTION

Figure 1:
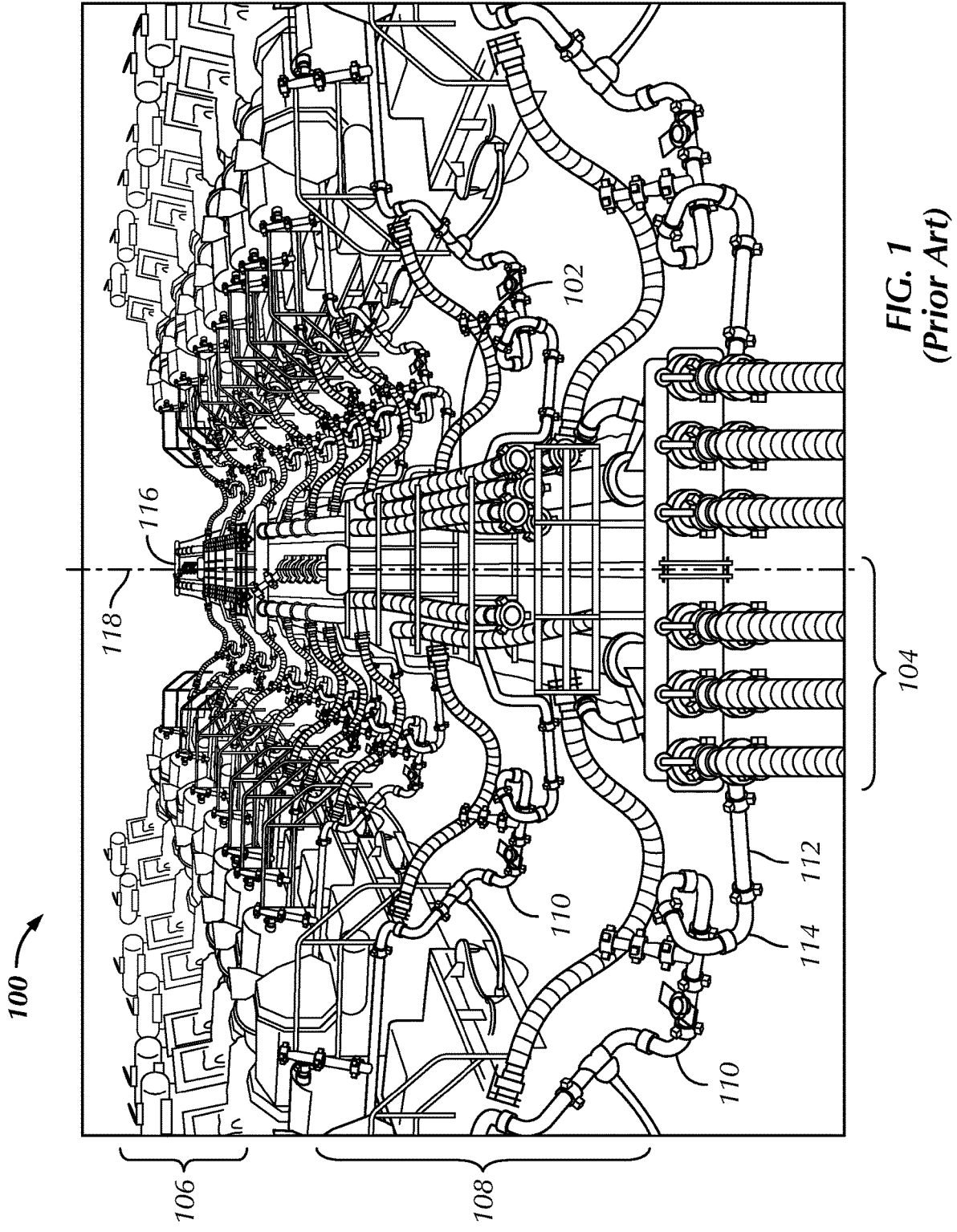
FIG. 1 is a perspective view of pumping system in accordance with the prior art.

Embodiments of the present disclosure will now be described in detail with reference to the accompanying FIGS. Like elements in the various FIGS. may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying FIGS. may vary without departing from the scope of the present disclosure.

As used herein, the term "coupled" or "coupled to" or "connected" or "connected to" may indicate establishing either a direct or indirect connection, and is not limited to either unless expressly referenced as such.

Referring to FIG. 1, a pumping system 100 is shown. The pumping system 100 includes a pump manifold 102 with inlet lines 104 for receiving low pressure fluid into the pump manifold 102. The pump manifold 102 distributes the low-pressure fluid to a plurality of pump trucks 106 through low pressure lines 108. Low pressure lines 108 are typically pipe, flexible tubing, or hose, such as formed from rubber or elastomeric material. Pumps disposed on the pump trucks 106 pressurize the fluid and return high pressure fluid to the pump manifold 102 through high pressure lines 110. The pump manifold 102 may be fluidly connected to one or more frac trees through intermediary equipment (not shown) that deliver pressurized fluid from the manifold to the frac trees. The high-pressure lines 110 shown are rigid pipes formed by connecting multiple straight or angled rigid pipe sections 112 using swivel joints 114. The rigid pipe sections 112 of high-pressure lines 110 can be formed from a metal material so as to withstand the high pressure of the fluid moving therethrough.

The high-pressure lines 110 formed from rigid pipe sections 112 can include angles and redundancies to create an indirect path between a back end of the pump trucks 106 and the pump manifold 102. Such a configuration allows for some absorption of vibrations caused by the pumps or by other equipment on board the pump trucks, such as mixing equipment. Pump trucks 106 may, for example, include mixing equipment for mixing sand with a fluid to create a mixture, often called a slurry, used to fracture the formation and prop open the fractures. Once pressurized, the high-pressure fluid or slurry can be selectively delivered to a wellbore by controlling an isolation valve 116 between the pump manifold 102 and the wellbore. Vibrations, bends, and contact with the ground may cause erosion, corrosion, leaks, and other pipe failures.

Still referring to FIG. 1, at least a portion of low-pressure lines 108 and high-pressure lines 110 extending between the pump manifold 102 and pump trucks 106 can rest on the ground in a space between the pump manifold 102 and the pump trucks 106. While this may allow for convenient assembly of the pumping system 100, the final arrangement may impede access to the pump manifold or pump trucks by cluttering walkway space. Additionally, pump trucks 106 must be parked in specific locations and orientations so that the rigid high-pressure lines 110 will reach an end connection on the pump trucks 106. In some configurations, the pump trucks 106 must be substantially equidistant from each other and arranged symmetrically or in a mirrored arrangement across two sides of the pump manifold 102 defined by a center line 118.

Figure 2:
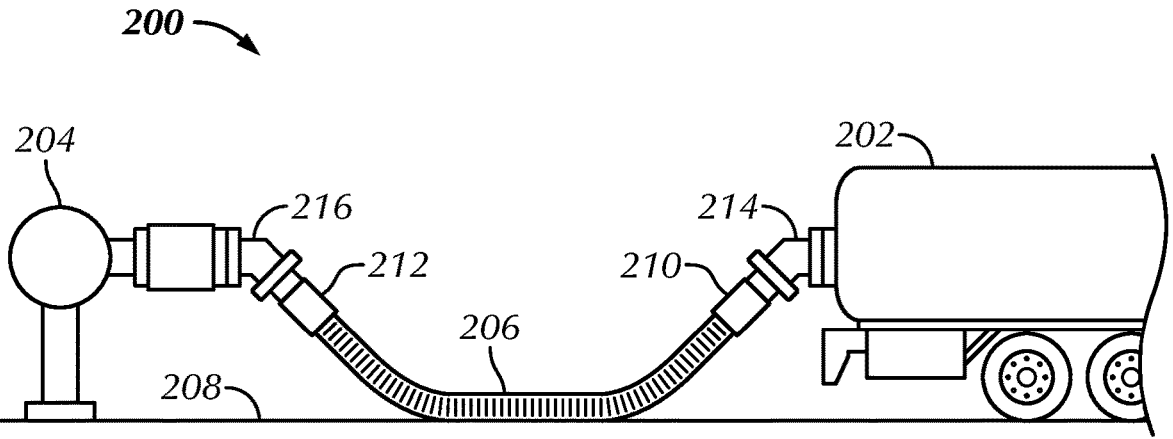
FIG. 2 is a side view of a connection system in accordance with the prior art.

FIG. 2 shows a side view schematic of a connection system 200 which uses flexible pipe to connect high pressure lines. A pump truck 202 is connected to a high-pressure inlet of manifold 204 via a flexible connection line 206. A portion of the line 206 rests on the ground 208. Flexible connection line 206 includes a first end 210 and a second end 212. The first end 210 connects to a back of the pump truck 202 using a first connector 214 and the second end 212 connects to the manifold 204 using a second connector 216. First and second connectors 214, 216 can be angled downwardly to facilitate the flexible connection line 206 resting on the ground 208 and to prevent straining the material of the flexible connection line 206 by relieving high angles. In some embodiments, first and second connectors 214, 216 permit motion such as swiveling or rotating about an axis. This arrangement may place the high-pressure flexible pipe in a walkway or workspace between the pump truck. Further, vibrations due to pumping may cause wear on an exterior of the pipe.

As described above, the use of rigid pipe to deliver high-pressure fluids from a pump truck to a manifold provides several drawbacks, including multiple bends, pressure loss, pipe failure due to vibrations and erosion, as well as a cluttered and inaccessible workspace, not to mention the back and hand injuries to workers installing and using rigid pipe. In contrast to such configurations, it has been found that flexible pipe, suitable for delivering high pressure erosive fluids from the pumps to the manifold, when formed in a downward concave arch, may provide for efficient delivery of the high-pressure fluids, reduced vibration between the pump and the manifold, reduced pressure drop, reduced leakage or failure events, and may provide a less cluttered and more accessible workspace, improving the safety of those working in and around it. Flexible pipe, as known to those skilled in the art, includes pipes having multi-layered construction providing a high-pressure capacity while being flexible, and differs from hose or other low-pressure "flexible" conduits. One example of a flexible pipe useful in embodiments herein may include that described in PCT/US2019/056987, among others. The arched flexible pipe may be, for example, fluidly coupled to and disposed between a pump outlet and a manifold inlet, such as in the form of a round arch, a round-headed or stilted arch, a horseshoe arch, a rounded trefoil or cloverleaf arch, a parabolic arch, a catenary arch, an elliptical arch, or other forms of arches that may provide for a relatively smooth bending fluid pathway traversing upward from the pump outlet or a connection thereto and downward to the manifold inlet or a connection thereto. As flexible pipes are relatively stiff, compared to hose, embodiments herein may provide for the flexible pipes to be configured as a self-supporting arch fluidly connecting the pump outlet to the manifold inlet. The relative flexibility of the flexible pipe used in making the connection may influence the self-supporting capability as well as the preferred type of arch formed by the pipe and end connection angles. The use of an arched flexible pipe to span the distance from the pump outlet to the fluid inlet may provide for the flexible pipe to span over walkways, over the pump trucks themselves, or other advantageous configurations envisionable by one skilled in the art. While smooth bending pathways may reduce erosion, flexible pipes may have a maximum or maximum bend radius beyond which the flexible pipe may kink or become damaged.

Referring now to FIGS. 3-8, a pumping system according to embodiments herein is shown. Pumping system 300 includes a first pump 301 disposed on a first pump truck 302. The first pump 301 includes a first fluid outlet 303 through which high-pressure fluid exits the first pump 301. The pumping system 300 further includes a manifold 304 having a first fluid inlet 305 for receiving high-pressure fluid. For illustration purposes only, the manifold may be a manifold skid, which may be fluidly connected to other manifold skids and other equipment on site to deliver pressurized fluid to a frac tree (see FIG. 9). However, the manifold may be any manifold provided at the site for fluid transportation. The first fluid inlet 305 is in fluid communication with a primary manifold conduit 306 of the manifold 304. The primary manifold conduit 306 may be used to distribute the high-pressure fluid to various equipment in fluid communication with the manifold 304.

In one or more embodiments, a first flexible pipe 307 having a first end 308 and a second end 309 transmits high pressure fluid between the first pump 301 and the manifold 304. In particular, the first end 308 fluidly connects to the first fluid inlet 305 and the second end 309 fluidly connects to the first fluid outlet 303 to allow high-pressure fluid transfer therebetween. The connections between the first and second ends 308, 309 and the first fluid inlet 305 and the first fluid outlet 303, respectively, can include a clamp hub connection 310 or other non-swiveling connection. In some embodiments, an angled or non-straight connection can be used to couple the first flexible pipe 307 to one or more of the first fluid outlet 303 and the first fluid inlet 305.

In some embodiments, the first flexible pipe 307 may include a first outer shell 311. The first outer shell 311 may be a segmented or curved pipe that surrounds a portion or all of the first flexible pipe 307. The segmented pipe may include a plurality of pipes coupled together to form a bend in the first outer shell 311. Each pipe of the plurality of pipes may have a small bend such that when each pipe is coupled together, the plurality of pipes forms one larger bend. For example, if the first outer shell 311 includes nine pipes coupled together with each of the pipes having a 10-degree bend, the first outer shell 311 would have a 90-degree bend. It is further envisioned that a protective sleeve may be provided at each connection between the plurality of pipes. In some embodiments, the curved pipe may be a singular pipe having a fixed radius to be curved from the first to second end. In other embodiments, the segments of the segmented pipe may be configured to allow the flexible pipe contained therein to lay straight, such as during transport to a well site/installation site. The first outer shell 311 may extend from the first end 308 of the first flexible pipe 307 to a point 312 on the first flexible pipe 307 between the first end 308 and the second end 309. With the first outer shell 311 extending from the first end 308 to the point 312 and being curved, the second end 309 of the first flexible pipe 307 may be a free end that hangs downward for easy connections to the first fluid outlet 303. Further, the first outer shell 311 may have fixed or adjustable radius to support an arch of the first flexible pipe 307. By supporting the first flexible pipe 307, the first outer shell 311 may be used as a lift point to raise the first flexible pipe 307 and connect the first flexible pipe 307 to the manifold 304. Further, the first outer shell 311 may prevent a minimum or maximum bend radius of the first flexible pipe 307 being exceeded during installation or use. It is noted that while the first outer shell 311 is shown mounted on the manifold 304, the first outer shell 311 may be mounted on a manifold trailer, pump truck, wellheads, frac trees, valve manifolds, and other manifolds in a fracturing operation at rig site to allow for the second end 309 of the first flexible pipe 307 to hang downward for easy connections, as described in FIG. 9.

In contrast to the pumping systems 100, 200, previously described, the first flexible pipe 307 may be essentially self-supporting between the first and second ends 308, 309 such that no portion of the first flexible pipe 307 touches the ground. As noted above, the ability of a flexible pipe to be self-supporting between the pump outlet and the manifold inlet may depend on a number of factors, including pipe variables such as the pipe flexibility, pipe diameter (inner and outer), the manufacture components of the pipe (type and arrangement of armor or reinforcing layers, etc.), among others, as well as arch variables, such as type of arch, arch radius, horizontal distance from the pump outlet to the manifold inlet, and connection angle to the pump outlet or manifold inlet, among others. Achieving an overall goal of elevating the flexible pipe may be accomplished in many embodiments without the need for additional support.

Some embodiments, however, may require a support bracket, such as proximate the pump outlet or manifold inlet, to minimally support the upward/downward pipe sections, or along a horizontal-spanning section of the arch, for example, to aid in forming and maintaining the arch during use. For example, a support or support bracket 313 may be used on the manifold 304 to support the first outer shell 311, supplementing and enabling the manifold 304 to be able to support the additional weight of the arched flexible pipe; the flexible pipe, however, may support the remainder of its own structure. The support bracket 313 may also include a flanged connection 314 to seal the first outer shell 311. Additionally, the first end 308 of the first flexible pipe 307 may extend past the support bracket 313 to couple to the clamp hub connection 310.

Figure 3:
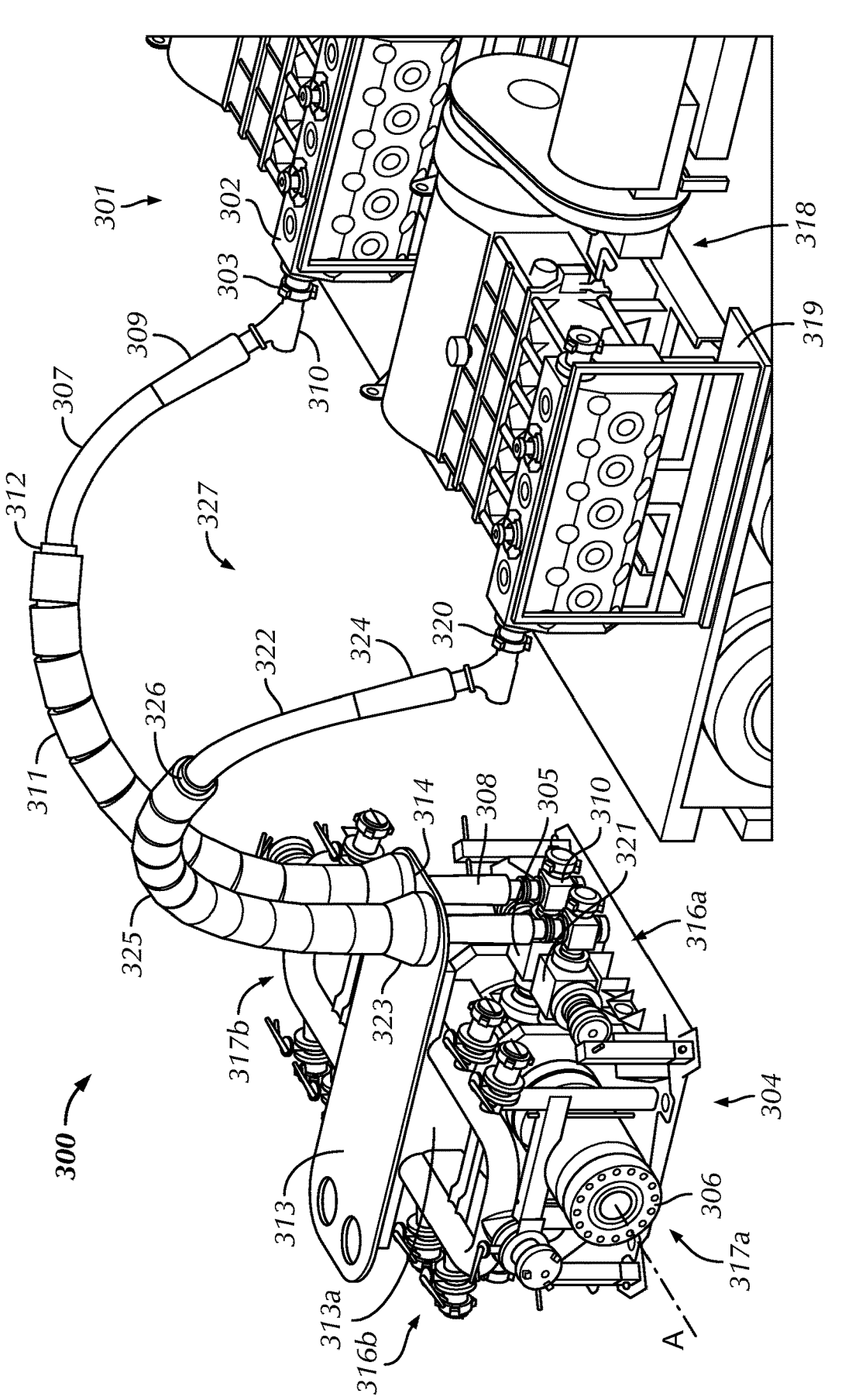
FIGS. 3-9 are pumping systems in accordance with embodiments of the present disclosure.

The first flexible pipe 307 can form an arch that extends upwardly from the two ends 308, 309 toward a center of the flexible pipe between the two ends. The arch of the first flexible pipe 307 can extend out of the first outer shell 311 and over the first pump truck 302 as shown in FIG. 3 such that the first flexible pipe 307 does not contact the ground or any other equipment between the first and second ends 308, 309. Thus, configurations using a self-supporting flexible pipe to connect the first fluid outlet 303 of first pump 301 to the first fluid inlet 305 of the manifold 304 can allow for new arrangements of pump trucks relative to the manifold 304 and can allow the pump trucks to park alongside and closer to the manifold to reduce equipment footprint on site.

The manifold 304 can include lateral sides 316a, 316b in addition to ends 317a, 317b. Ends 317a, 317b can refer to bounds of the manifold 304 that an axis A of the primary manifold conduit 306 extends. The first fluid inlet 305 can be disposed on a lateral side 316a, 316b of the manifold 304 to be perpendicular or angled with respect to the primary manifold conduit 306. In particular, the first fluid inlet 305 can be disposed on lateral side 316a which is adjacent the first pump truck 302 when the first pump truck 302 is parked along the manifold 304 as shown in FIG. 3. The first flexible pipe 307 extends from the first fluid inlet 305 on the lateral side 316a over the manifold 304 and other equipment disposed thereon to connect with the first fluid outlet 303 of the first pump 301 on the first pump truck 302.

In some fracturing operations, multiple pump trucks, each including a pump, may be required to deliver necessary fluid pressures and volumes to a wellbore. For example, as shown in FIG. 3, a second pump 318 may be included on a second pump truck 319 adjacent to both the manifold 304 and the first pump truck 302. The second pump 318 includes a second fluid outlet 320 configured to be connected to a second fluid inlet 321 on the manifold 304 by a second flexible pipe 322. The second flexible pipe 322 includes a first end 323 and a second end 324 configured to connect to the second fluid inlet 321 and the second fluid outlet 320, respectively. The second flexible pipe 322 is shown on the same lateral side 316a of the manifold 304 as the first flexible pipe 307; however, other arrangements are possible where second flexible pipe 322 is on the other lateral side 316b. In the configuration shown, the second flexible pipe 322 is self-supporting between first and second ends 323, 324, respectively, and forms an arch extending over the manifold 304 and on to the second pump truck 319 without touching the ground or any other equipment between the first and second ends 323, 324.

Still referring to FIG. 3, the second flexible pipe 322 may also include a second outer shell 325. The second outer shell 325 may be a segmented pipe that surrounds a portion or all of the second flexible pipe 322. For example, the second outer shell 325 may extend from the first end 323 of the second flexible pipe 322 to a point 326 on the second flexible pipe 322 between the first end 323 and the second end 324. With the second outer shell 325 extending from the first end 323 to the point 326, the second end 324 of the second flexible pipe 322 may be a free end that hangs downward for easy connections to the second fluid outlet 320. Further, the second outer shell 325 may have a fixed or adjustable radius to support an arch of the second flexible pipe 322. By supporting the second flexible pipe 322, the second outer shell 325 may be used as a lift point to raise the second flexible pipe 322 and connect the second flexible pipe 322 to the manifold 304. Further, the second outer shell 325 may prevent a minimum or maximum of the second flexible pipe 322 being exceeded during installation or use.

In some configurations, as shown by FIG. 3, a space 327 between the manifold 304 and the pump trucks 302, 319 may be formed. In some embodiments, the space 327 may include walkways used by workers on site to access various pieces of equipment. Using self-supporting flexible pipes 307, 322 forming arches in the air without touching the ground or other equipment removes potentially hazardous obstacles from walkways or access points used by workers in the field.

While the pumps disposed on the pump trucks are illustrated having outlets on an end of the pump truck, other configurations are possible. For example, pumps may be arranged on the pump truck such that one or more fluid outlets are oriented toward a lateral side of the pump truck. Depending on whether the truck is facing toward or away from the manifold skid, a self-supporting flexible pipe connecting the fluid outlet at the end of a truck to a fluid inlet of a manifold skid may form an arch that extends over the truck or over a space between the truck, respectively.

Pump trucks 302, 319 supply fluid to manifold 304. The manifold 304 feeds fluid to various other equipment such as a missile where fluid is selectively supplied to a wellbore. Additional pumps and/or pump trucks may be connected to the manifold 304, or to additional manifolds (not shown) that are fluidly connected to the missile, to provide additional fluid pumping capacity depending on the needs of the particular oilfield process. In general, the self-supporting flexible pipe arrangement disclosed herein allows for pump truck and pump placement in a variety of configurations relative to the manifold. The flexible pipe can range in length between approximately 10 feet and approximately 30 feet, such as 15 feet to 25 feet in some embodiments. In some examples, the length of the flexible pipe is around 20 feet. Depending upon the size (nominal pipe diameter, for example) and make-up (central conduit thickness, armoring layers, etc.) of the flexible pipe, the self-supporting length may be greater or less than the range noted above.

Figure 4:
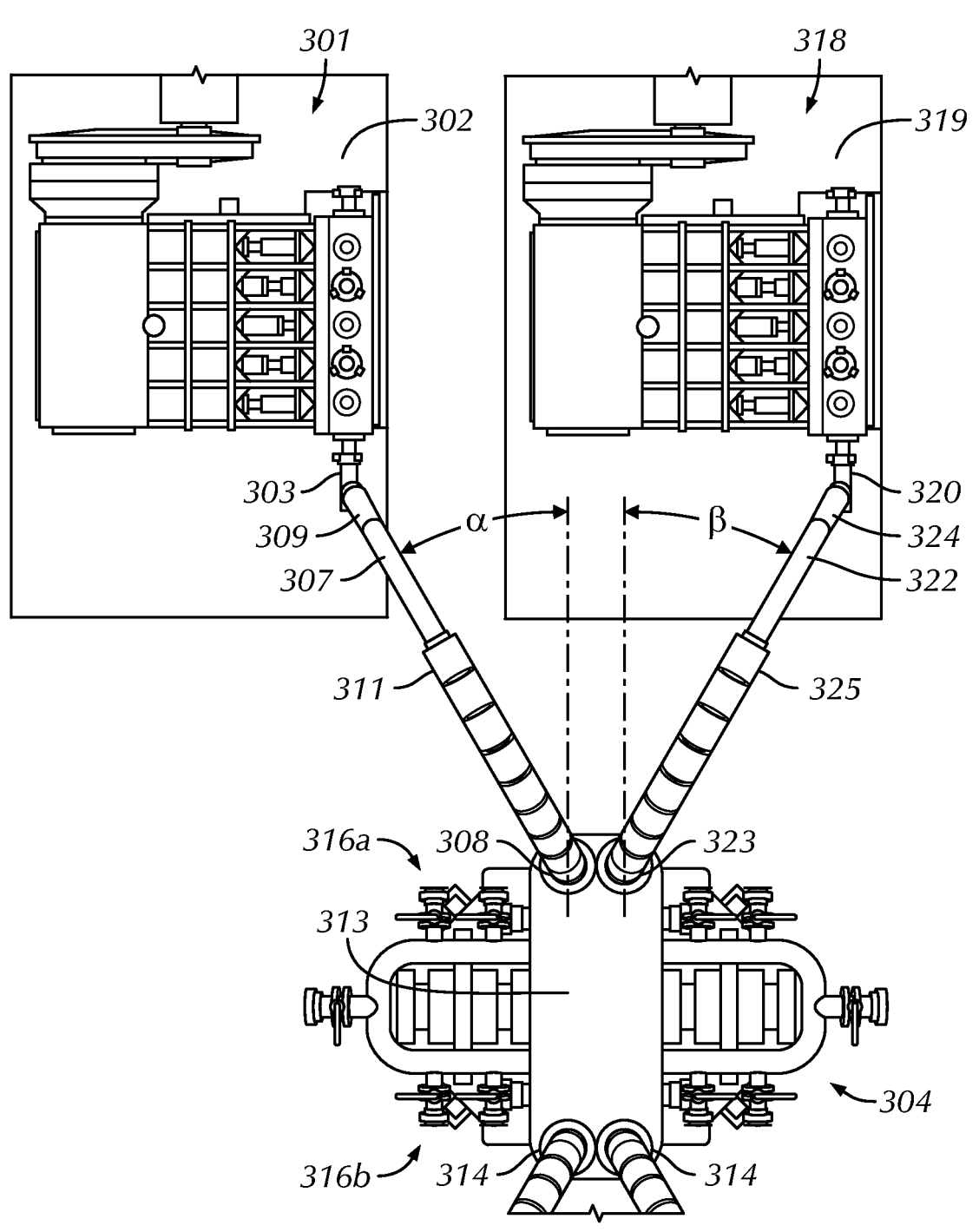

Now referring to FIG. 4, a top view of FIG. 3 is illustrated. The support bracket 313 may extend between the lateral sides 316a, 316b of the manifold 304. On the lateral sides 316a, 316b, the support bracket 313 may include one or more flanged connections 314. When the self-supporting flexible pipes 307, 322 are lifted on the manifold 304, the outer shells 311, 325 of the self-supporting flexible pipes 307, 322 are mounted on the one or more flanged connections 314 of support bracket 313 at the lateral sides 316a, 316b.

In one or more embodiments, the one or more flanged connections 314 may allow for the self-supporting flexible pipes 307, 322 to be angled. For example, the first end 308 of the first flexible pipe 307 is mounted about an axis of the one or more flanged connections 314. From the axis of the one or more flanged connections 314, the second end 309 of the first flexible pipe 307 may be angled at an angle α. By having the angle α, the second end 309 of the first flexible pipe 307 may connect to the first fluid outlet 303 of the first pump 301 disposed on the first pump truck 302 without having the first pump truck 302 aligned with the manifold 304. Additionally, the first end 323 of the second flexible pipe 322 is on the corresponding flange connection 314 while the second end 324 of the second flexible pipe 322 is angled an angle β off the corresponding flange connection 314 such that the second end 324 may connect to the second fluid outlet 320 of the second pump 318 disposed on the second pump truck 319. By having the angles α, β of the first and second flexible pipe 307, 322, the first pump truck 302 may be parked near the second pump truck 319. The angles α, β of the first and second flexible pipe 307, 322, may be varied such the corresponding pump truck being connected to the first and second flexible pipes 307, 322 may be parked at any position adjacent to the manifold 304.

Figure 5:
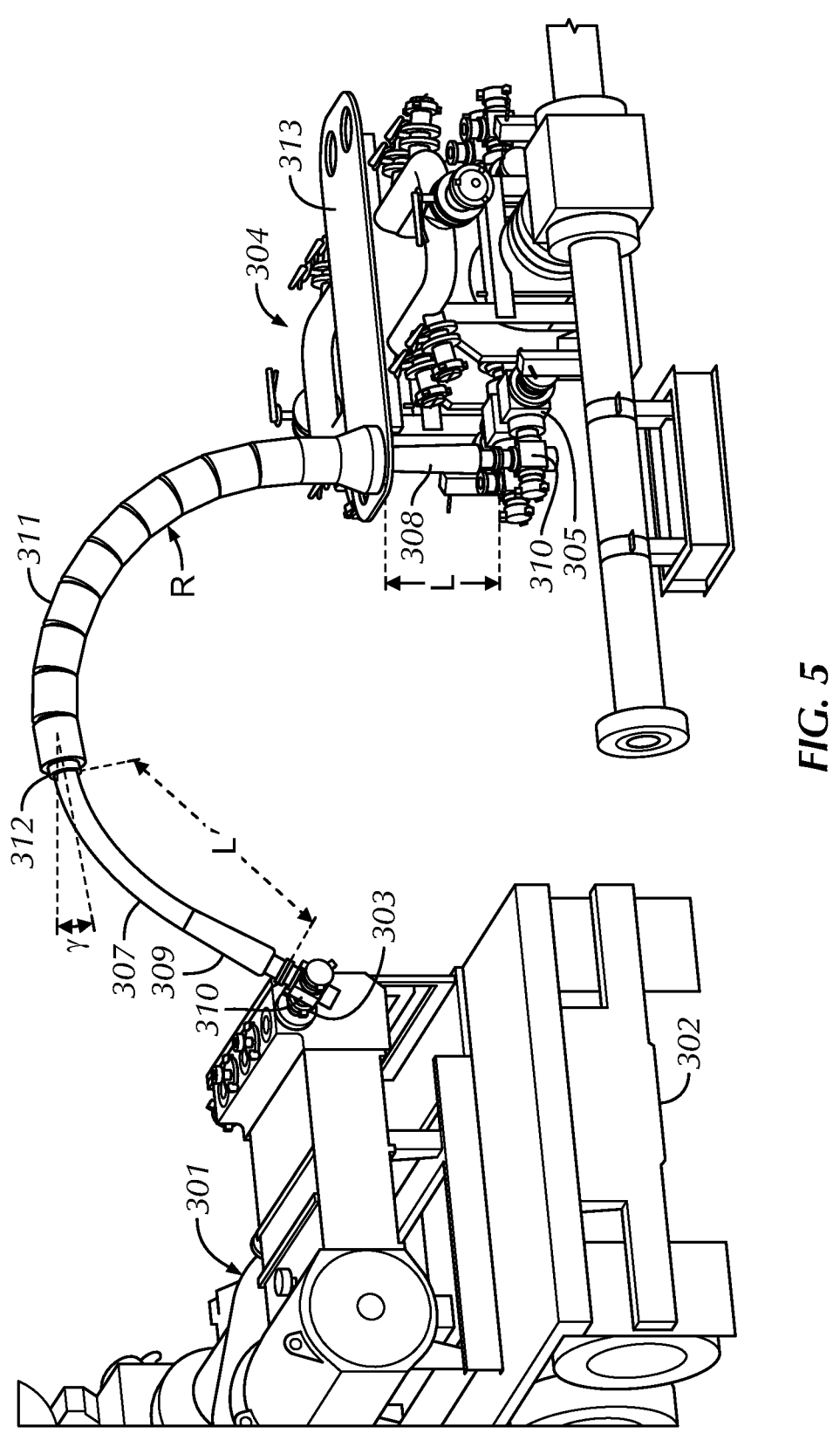

In some embodiments, the first end 308 of the first flexible pipe 307 extends past the support bracket 313 as shown in FIG. 5. For example, the first end 308 of the first flexible pipe 307 may extend a length L below the support bracket 313 to directly connect to clamp hub connection 310 at the first fluid inlet 305. In this configuration, the outer shell 311 is mounted on the support bracket 313 and extends to the point 312 between the support bracket 313 and the second end 309 of the first flexible pipe 307. Additionally, the outer shell 311 may have a radius R that is fixed such that the first flexible pipe 307 is bent at the fixed radius R.

As shown in FIG. 5, the outer shell 311 may flex outward and downward at an angle γ from the point 312. From the point 312, the first flexible pipe 307 extend a length L' to the second end 309. Further, the angle γ may allow the outer shell 311 to create a weightless effect to the second end 309 of the first flexible pipe 307 by forcing the length L' of the first flexible pipe 307 slightly upward.

Figure 6:
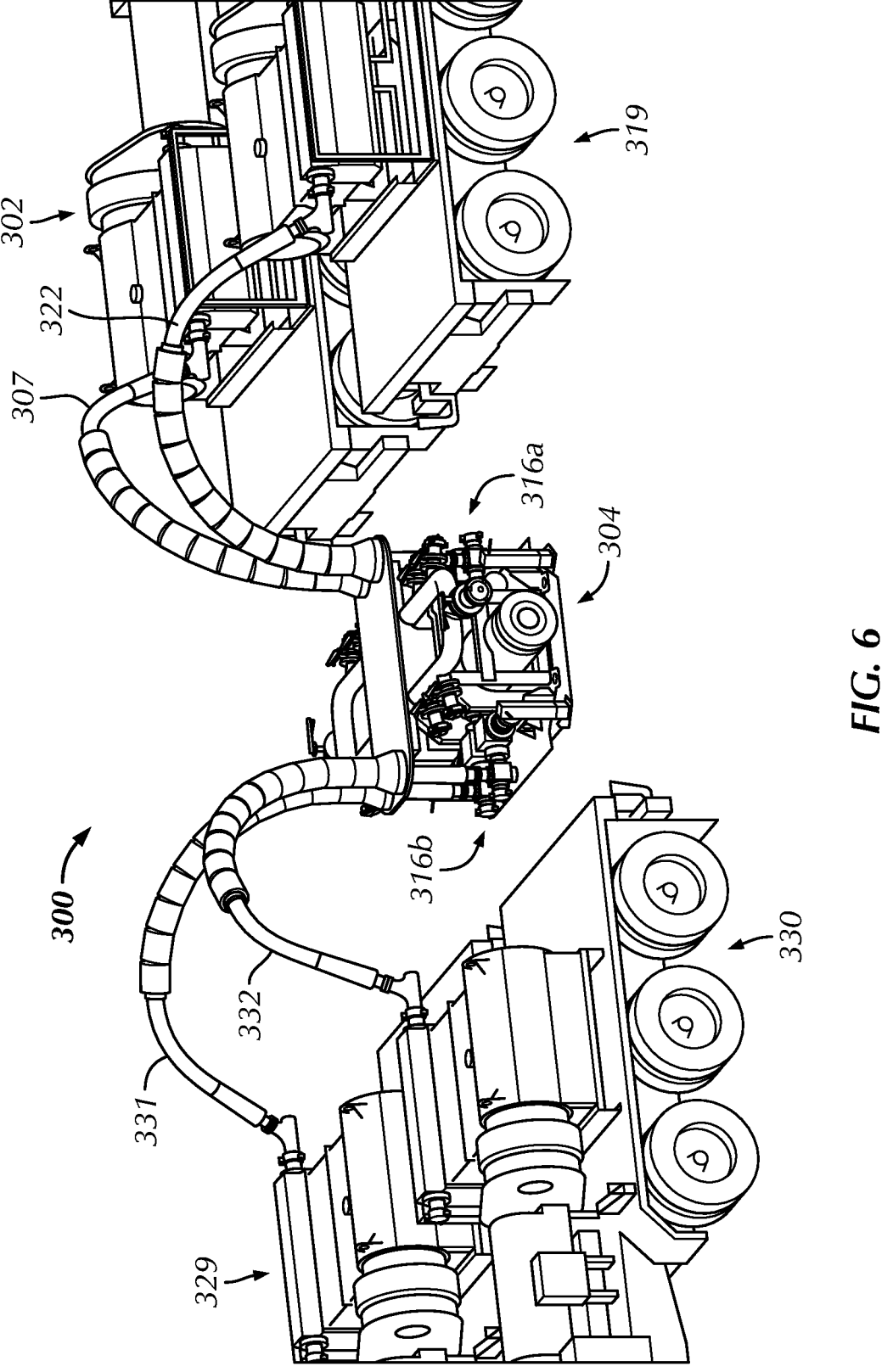
Figure 7:
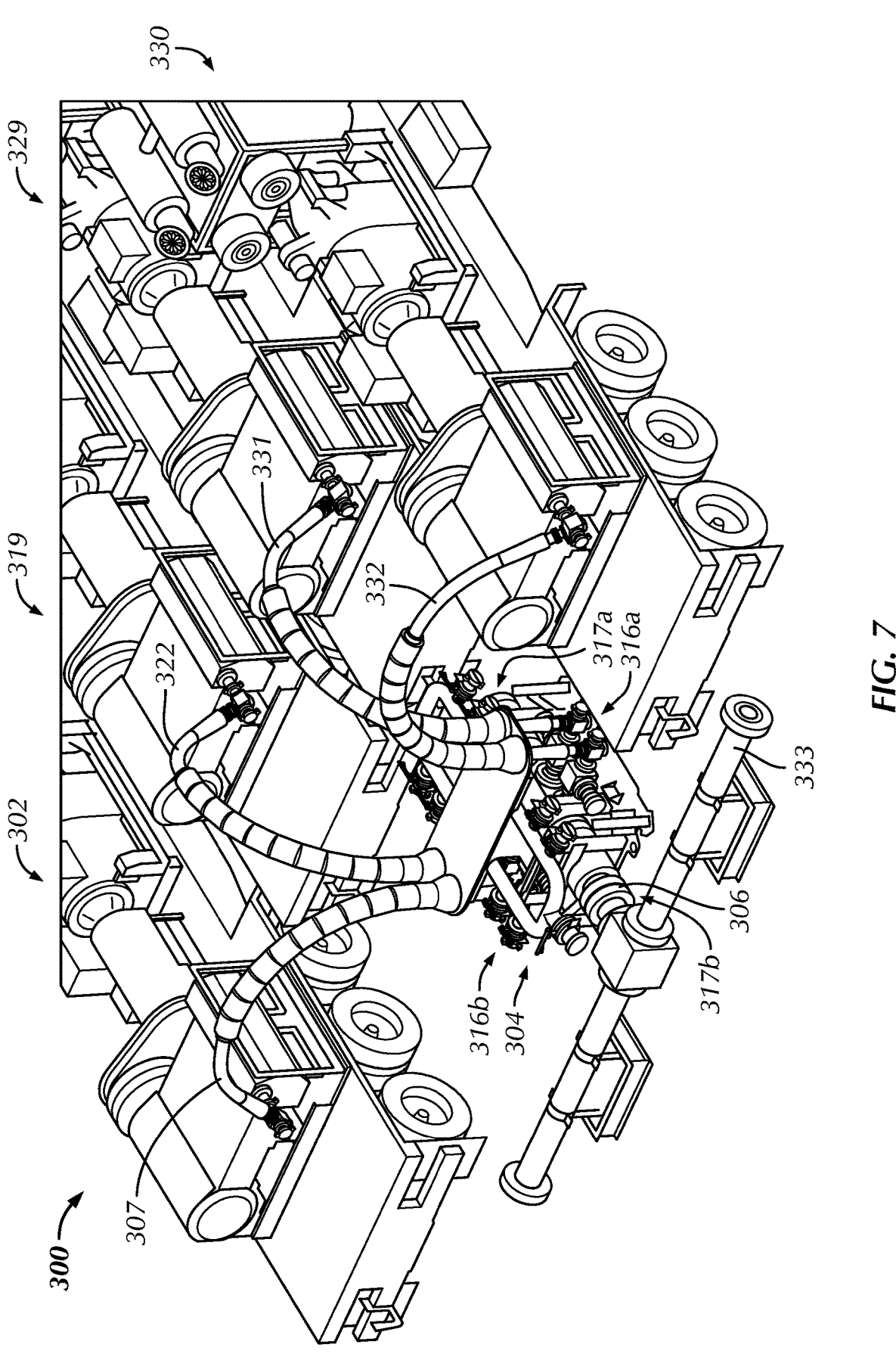

As discussed above, several pumps can be connected to a single manifold. A system using self-supporting flexible pipes to connect pumps to a manifold allows for a wider range of possible pump locations and orientations relative to the manifold. Further, a wider range of pump truck configurations may be used, such as those having pump outlets located at an end of a trailer or a middle of a trailer. Referring to FIGS. 6 and 7, perspective views of the pumping system 300 are shown to illustrate possible locations of pump trucks relative the manifold 304. For example, in FIG. 6, the first pump truck 302 and the second pump truck 319 may be on the lateral side 316a of the manifold 304 while a third pump truck 329 and a fourth pump truck 330 may be on the other lateral side 316b of the manifold 304. In this configuration, the first flexible pipe 307 and the second flexible pipe 322 extend from the lateral side 316a of the manifold 304 to the first pump truck 302 and the second pump truck 319, respectively. In addition, a third flexible pipe 331 and a fourth flexible pipe 332 extend from the other lateral side 316b of the manifold 304 to the third pump truck 329 and the fourth pump truck 330, respectively.

Now referring to FIG. 7 another embodiment of a pumping system 300 according to embodiments herein is illustrated, where like numerals represent like parts. The embodiment of FIG. 7 is similar to that of the embodiment of FIG. 6. However, instead of being at the lateral ends 316a, 316b, of the manifold 304, the pump trucks 302, 319, 329, 330 may all be at the end 317a of the manifold 304. Further, at the other end 317b of the manifold 304, a missile skid 333 may be provided to be in fluid communication with the primary manifold conduit 306 of the manifold 304.

The manifold 304 feeds fluid to various other equipment such as a missile where fluid is selectively supplied to a wellbore. Additional pumps and/or pump trucks may be connected to the manifold 304, or to additional manifolds (not shown) that are fluidly connected to the missile, to provide additional fluid pumping capacity depending on the needs of the particular oilfield process.

Figure 8:
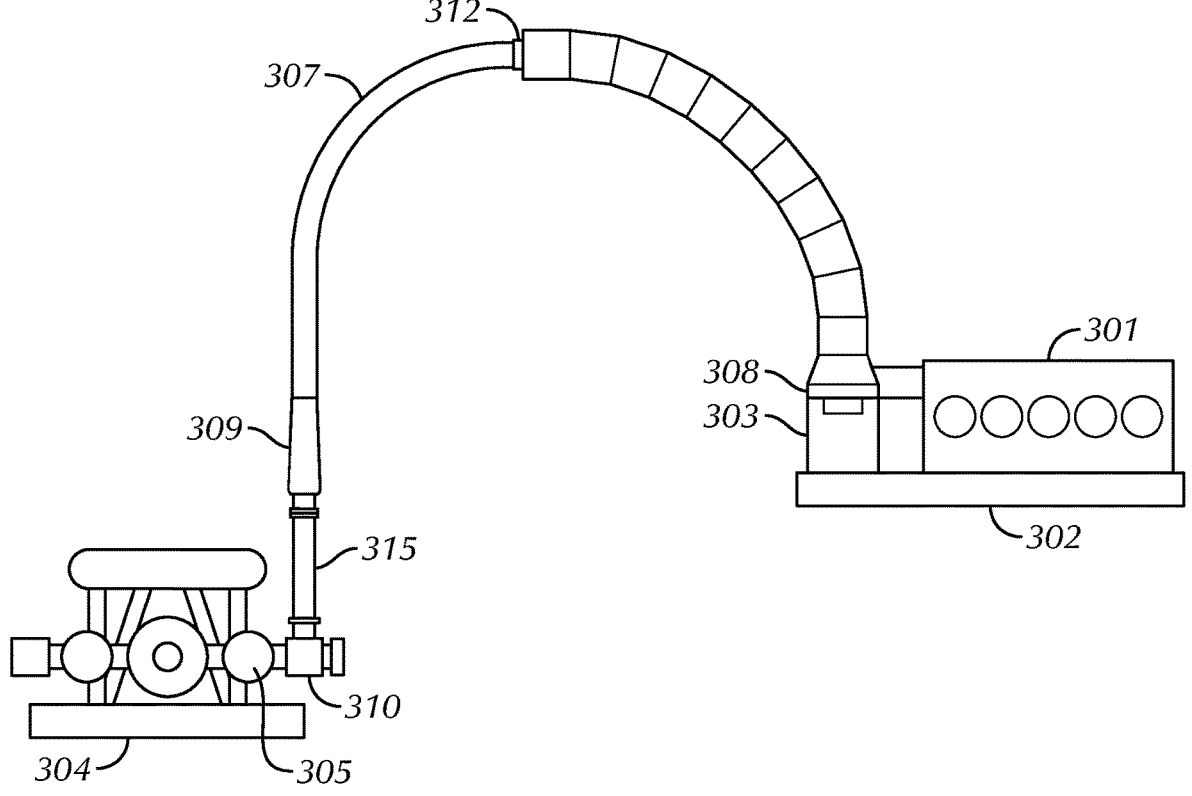

Now referring to FIG. 8 another embodiment of a pumping system 300 according to embodiments herein is illustrated, where like numerals represent like parts. The embodiment of FIG. 8 is similar to that of the embodiment of FIG. 3. However, instead of the first end 308 of the first flexible pipe 307 being connected at the manifold 304, the first end 308 of the first flexible pipe 307 may be connected to the first pump truck 302. For example, the first outer shell 311 may be mounted on the first pump truck 302 such the second end 309 may be the free end that hangs downward for easy connections to the first fluid inlet 305. It is further envisioned that an additional pipe 315, extending upward from the clamp hub connection 310, may be used to fluidly connect the first flexible pipe 307 to the first fluid inlet 305.

Figure 9:
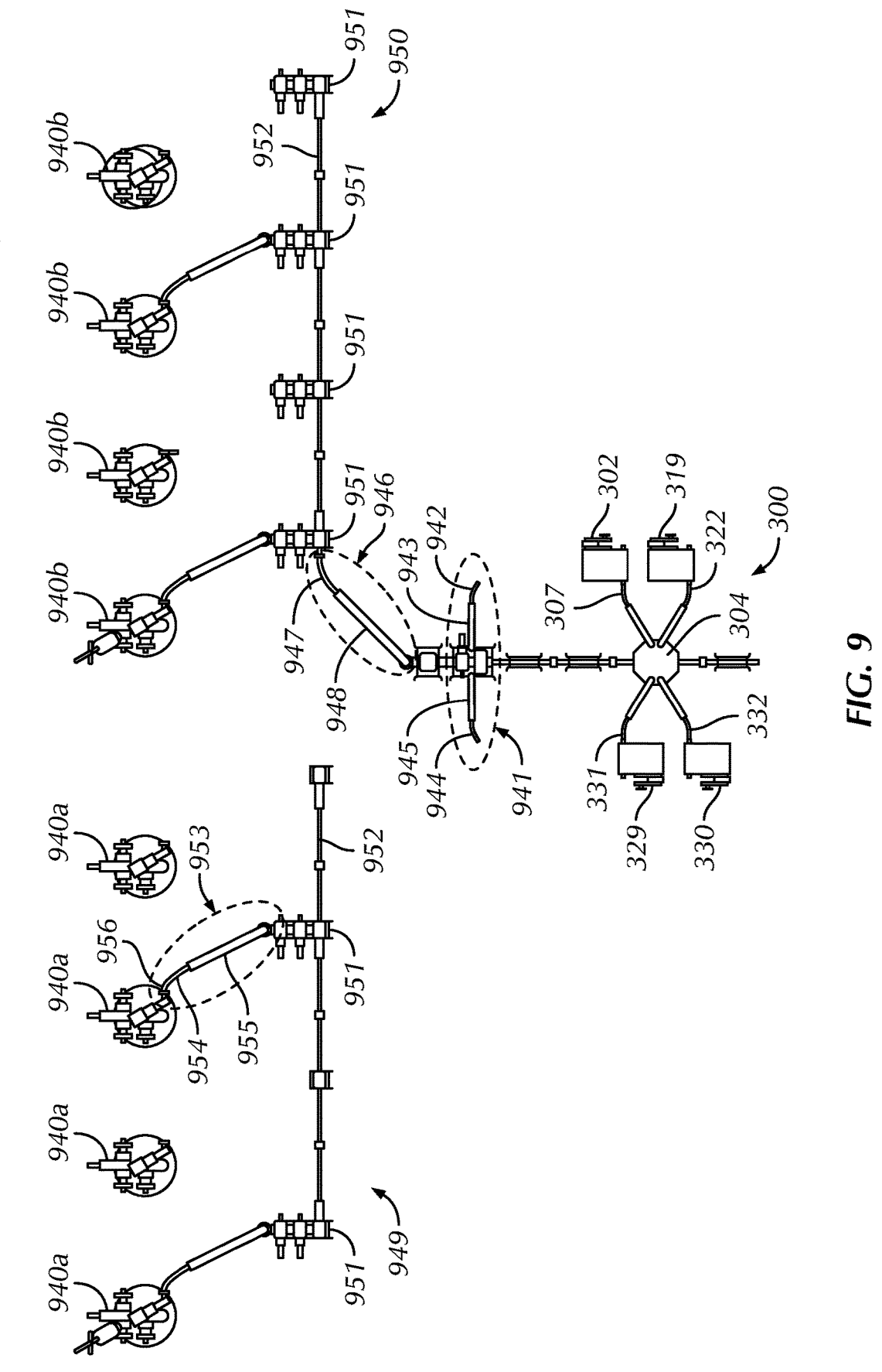

Now referring to FIG. 9, in one or more embodiments, the pumping system 300 of FIGS. 3-8 is illustrated in fluid communication with one or more frac trees (940a, 940b) at a well site 900. The manifold 304 of the pumping system 300 is fluidly connected to other manifold skids and other equipment on site to deliver pressurized fluid to the one or more frac trees (940a, 940b). For example, the manifold 304 is fluidly coupled to an auxiliary skid 941. The auxiliary skid 941 may include one or more electronically controlled pressure relief valves (ePRV) which may be electrically powered and require no gas bottles or hoses. Additionally, the auxiliary skid 941 includes an ePRV dedicated flexible pipe 942 with an outer shell 943 mounted in fluid communication to the one or more ePRVs and a prime up/bleed down dedicated flexible pipe 944 with an outer shell 945 mounted in fluid communication to prime up/bleed down lines.

In one or more embodiments, from the auxiliary skid 941, a zipper line 946 includes one or more zipper dedicated flexible pipes 947 with an outer shell 948. The zipper line 946 fluidly couples the auxiliary skid 941 to either a first zipper manifold assembly 949 or a second zipper manifold assembly 950. Each of the zipper manifold assemblies (949, 950) may include one or more zipper manifold skids 951 and one or more spacer skids 952. The one or more zipper manifold skids 951 refers to a modular skid that is purpose built for connection to a wellhead (i.e., the one or more frac trees (940a, 940b)), which may include an outlet head (which may be referred to as a fracturing head or goat head in fracturing operations) for connection to the wellhead and one or more gate valves. The one or more spacer skids 952 (modular skids that are purpose built to provide spacing between adjacent modular skids, which may include equipment to connect between the equipment in the adjacent modular skids) may be provided between the one or more zipper manifold skids 951 to provide closer alignment of the spacing between the one or more zipper manifold skids 951 with the spacing between the one or more frac trees (940a, 940b).

In some embodiments, each of the zipper manifold assemblies (949, 950) includes one or more well lines 953 to fluidly couple the one or more zipper manifold skids 951 to the one or more frac trees (940a, 940b). Each well line 953 includes a tree dedicated flexible pipes 954 with an outer shell 955. Each of the tree dedicated flexible pipes 954 fluidly couples the one or more zipper manifold skids 951 to the one or more frac trees (940a, 940b) thereby forming a flow path to deliver pressurized fluid from the pump trucks 302, 319, 329, 330.

Still referring to FIG. 9, the outer shell 955 is rotationally mounted on the one or more zipper manifold skids 951 such that a first end of tree dedicated flexible pipes 954 is fluidly coupled to a fluid outlet of the one or more zipper manifold skids 951. From the outer shell 955, an end 956 of the tree dedicated flexible pipes 954 is a free end that hangs downward for easy connections to an inlet of the one or more frac trees (940a, 940b). For example, the free end (956) may be switched from a first inlet of a first frac tree to a second inlet of a second frac tree. The free end (956) may first be coupled to an inlet of a first frac tree (940a, 940b). After frac operations are completed at the first frac tree (940a, 940b), the free end (956) may be fluidly disconnected from the inlet. Next, the outer shell 955 may be rotated to move the free end (956) from the inlet of a first frac tree (940a, 940b) to an inlet of a second frac tree (940a, 940b). The free end (956) may then be fluidly coupled to the inlet of the second frac tree (940a, 940b).

Furthermore, methods of the present disclosure may include installation and use of the pumping system and other structures, such as in FIGS. 3-9. Because the method may apply to any of the embodiments, reference numbers are not referenced to avoid confusion of the numbering between the different embodiments.

Connecting the arched flexible pipe to a pump and manifold may include steps such as executing a one-point lift to pick up the flexible pipe, allowing the flexible pipe to drape downward from an outer shell in a downward or upside-down "u" shape, supporting the flexible pipe using a crane and moving the flexible pipe to the installation location. For example, a lifting device (e.g., crane or forklift) may connect to a lift point on the outer shell and raise the outer shell to mount the outer shell on a manifold. In some embodiments, the outer shell may be mounted on a support bracket of the manifold. The support bracket may be raised a height above a base of the manifold such that the outer shell raised above the components of the manifold. The flexible pipe may be inserted in the outer shell before or after the outer shell is lifted and mounted on the manifold. Once the flexible pipe is near the installation location, a first end of the flexible pipe is manipulated to align with a mounting point on a manifold inlet or an intermediate connector and the first end is connected to the manifold inlet or intermediate connector. In some embodiments, the first end may extend out of the outer shell to the mounting point.

With the outer shell mounted on the manifold, a second end of the flexible pipe extends outwardly from the outer shell. The outer shell may have a bend radius such that a weightlessness effect is created on the second end of the flexible pipe. In fact, the lifting device (e.g., crane or forklift) may be moved off site and out of the way for further operations. At this point, the first end of the flexible pipe is fluidly connected to the manifold while the second end is a free end to be easily manipulated and connected to other fluid conduits. One skilled in the art will appreciate how the flexible pipe is formed into an arch and self-supporting. The above method may be repeated to add one or more flexible pipes to the manifold as well as other manifolds.

In some embodiments, a pump truck may be positioned proximate to the manifold at any angle without having the lifting device (e.g., crane or forklift) creating positional barriers at the site. With the pump truck in position and by having the weightlessness effect, the second end of the flexible pipe is manipulated, without the aid of the lifting device (e.g., crane or forklift), to align with a mounting point on a pump outlet or on an intermediate connector, and the second end is fluidly connected with the pump outlet or intermediate connector. Fastening the ends of flexible pipe to the pump, manifold, or intermediate connectors may include fastening a clamp. The intermediate connectors may be straight or angled. The above method may be repeated to position one or more pump trucks proximate the manifold and fluidly connect to a corresponding flexible pipe. It is further envisioned that moving the pump trucks in and out of the pumping system or disconnecting for repair or replacement of the pump systems is facilitated by disconnecting the second end of the corresponding flexible pipe and leaving the second end free hanging from the outer shell of the corresponding flexible pipe. By leaving the second end free hanging, the corresponding pump truck may be moved out and a new pump truck may be moved in and fluidly connect to the second end of the corresponding flexible pipe. In some embodiments, when the corresponding pump truck is moved out, repairs and maintenance may be conducted on the pump system, and then the same corresponding pump truck may be moved back into position to re-connect with the second end of the corresponding flexible pipe.

In addition to providing equipment layout flexibility and reducing tripping hazards by clearing the ground of obstacles, the use of arched and, in some embodiments, self-supporting, flexible pipes also helps to reduce vibrations within the system. The arched flexible pipe is able to move in the air as fluid is pumped therethrough and the motion of the flexible pipe dampens vibrations that would otherwise be transmitted throughout the system by a rigid pipe. This feature may improve reliability of components within the pumping system by reducing vibration-induced stresses. The reduced vibrations may also allow pumps to run at higher revolutions per minute for longer periods of time.

Further advantages of flexible pipe connections are realized due to the smooth arch formed between the two ends. The smooth arch reduces stress concentrations and pipe erosion compared to the many stress concentrations created by various angles and turns required in a rigid pipe connection. The reduced stress and erosion may contribute to better system reliability. Additionally, the smooth arch and lack of angles or redundancies in the connection reduces fluid pressure drop from the pump outlet to the manifold inlet. This is particularly advantageous as it helps deliver high pressure fluid needed for various downhole operations without overworking pump equipment.

As discussed previously, rigid pipes typically include various segments and joints that must be assembled to meet up and connect with a back end of a pump truck where high pressure fluid will be delivered to the pipe from the pump via an intermediate connector on board the pump truck. This assembly process is time consuming, especially when several pump trucks are involved, as shown in FIG. 1. Additionally, because of the spatial constraints of the truck position, rigid pipes are not connected directly to pump outlets. The intermediate connector must transfer fluid from the pump toward the back of the pump truck and connect to the rigid pipe. This additional componentry occupies valuable space on board a pump truck.

In contrast, the arched flexible pipe can have the second free hanging end quickly and easily connected to a fluid outlet on a pump using, for example, clamp hub connections. The connectors may be parallel, angled, non-straight, or 90-degree connectors. This significantly reduces set up and assembly time and also allows for more efficient use of space available on a pump truck by eliminating the need for lifting devices (e.g., crane or forklift), extraneous intermediate connectors or support bracketry for most, and possibly all, embodiments herein. The flexible pipe extends in an upward direction from the fluid inlet on the manifold and then in a downward direction to the fluid outlet on the pump, thereby forming an arch shape. While horizontal connectors may be used, angled connectors having an angle greater than 30 degrees from horizontal may reduce strain on the flexible pipe and facilitate forming an arch shape. In some embodiments, the angled connectors may have an angle between 30-45 degrees, 45-60 degrees, or 60-90 degrees from horizontal. As used herein, "horizontal" and "vertical" are relative to the ground, especially that around the location of the pump truck, as would be readily understood by one skilled in the art.

While various configurations of pumping systems have been described with respect to a limited number of embodiments, those skilled in the art, having benefit of this disclosure, will appreciate that other embodiments can be devised which do not depart from the scope of the present disclosure. Accordingly, the scope of the disclosure should be limited only by the attached claims.

The invention claimed is:

1. A system, the system comprising:
a first frac tree having a first fluid inlet;
a manifold having a first fluid outlet;
a first flexible pipe, wherein the first flexible pipe comprises:
    a first end of the first flexible pipe fluidly coupled, by a non-swiveling connection, to the first fluid outlet, and
    a second end of the first flexible pipe fluidly coupled, by a non-swiveling connection, to the first fluid inlet; and
a first outer shell, enclosing and supporting at least a portion of the first flexible pipe, mounted on the manifold,
    wherein the first outer shell extends from the manifold towards the second end, wherein the first outer shell forms an arch in a first vertical plane, and
    wherein the arch is configured to permit manipulation from the first vertical plane to a second vertical plane without using a lifting device.

2. The system of claim 1, wherein the second vertical plane contains the first fluid outlet and a second fluid inlet of a second frac tree.

3. The system of claim 2, further comprising:
a third frac tree having a third fluid inlet,
    wherein the first fluid outlet and the third fluid inlet lie in a third vertical plane, and
    wherein the arch is configured to permit manipulation from the second vertical plane to the third vertical plane without using the lifting device.

4. The system of claim 1, wherein the first outer shell further comprises a plurality of pipes coupled together, and wherein each pipe of the plurality of pipes has a bend radius added together to equal the bend radius of the first outer shell.

5. The system of claim 1, wherein the first flexible pipe extends in an upward direction from the first fluid outlet and extends in a downward direction from the first outer shell.

6. The system of claim 1, wherein the first outer shell comprising a plurality of pipes coupled together with a protective sleeve provided at each connection between each pipe of the plurality of pipes and an adjacent pipe.

7. A system to deliver pressurized fluid to one or more frac trees, the system comprising:
a first pump truck having a first pump disposed thereon, wherein the first pump comprises a first fluid outlet;
a manifold having a second fluid outlet and a plurality of fluid inlets, wherein the first fluid outlet of the first pump is fluidly connected to a first fluid inlet of the plurality of fluid inlets;
a first flexible pipe, wherein the first flexible pipe comprises:
    a first end of the first flexible pipe fluidly coupled, by a non-swiveling connection, to the second fluid outlet of the manifold, and
    a second end of the first flexible pipe fluidly coupled, by a non-swiveling connection, to a fluid inlet of a first frac tree; and
a first outer shell, enclosing and supporting at least a portion of the first flexible pipe, mounted on the manifold, the first outer shell extending from the manifold a length between the first end and the second end to an end point,
    wherein the first flexible pipe extends in a downward direction an exposed length from the end point to the second end,
    wherein the first outer shell forms a self-supporting arch in a first vertical plane, and
    wherein the arch is configured to be manipulation from the first vertical plane to a second vertical plane without using a lifting device.

8. The system of claim 7, further comprising:
at least one electronically controlled pressure relief valve fluidly connected to the manifold;
a second flexible pipe, wherein the second flexible pipe comprises a first end of the second flexible pipe fluidly coupled to the electronically controlled pressure relief valve; and
a second outer shell mounted on the electronically controlled pressure relief valve, the second outer shell extending from the electronically controlled pressure relief valve a length between the first end and a second end of the second flexible pipe, wherein the second outer shell is curved to have a radius to arch the second flexible pipe from the electronically controlled pressure relief valve.

9. The system of claim 8, further comprising:

at least one prime up/bleed down line fluidly connected to the manifold;

a third flexible pipe, wherein the third flexible pipe comprises a first end of the third flexible pipe coupled to the prime up/bleed down line; and a third outer shell mounted on the prime up/bleed down line, the third outer shell extending from the at least one prime up/bleed down line a length between the first end and a second end of the third flexible pipe, wherein the third outer shell is curved to have a radius to arch the third flexible pipe from the at least one prime up/bleed down line.

10. The system of claim 7, further comprising a second frac tree having a second fluid inlet, wherein the second fluid outlet of the manifold and the second fluid inlet of the second frac tree lie in the second vertical plane.

11. The system of claim 7, the first outer shell comprising a plurality of pipes coupled together with a protective sleeve provided at each connection between each pipe of the plurality of pipes and an adjacent pipe.

12. A method for fluidly connecting a manifold to at least two frac trees, the method comprising:

attaching a flexible pipe and an outer shell, enclosing at least a portion of a length of the flexible pipe, to the manifold, wherein a first end of the flexible pipe fluidly connects, with a non-swiveling connection, to a fluid outlet of the manifold, and wherein the outer shell mounts on a non-swiveling structure of the manifold;

disposing a second end of the flexible pipe to form an arch supported by the outer shell in a vertical plane containing the first end and a first fluid inlet of a first frac tree of the at least two frac trees;

fluidly connecting the second end of the flexible pipe to the first fluid inlet; and switching the second end of the flexible pipe from the first fluid inlet of the first frac tree to fluidly connect to a second fluid inlet of a second frac tree of the at least two frac trees without using a lifting device, wherein the fluid outlet of the manifold and the second fluid inlet lie in a second vertical plane different from the first vertical plane.

13. The method of claim 12, wherein switching the second end of the flexible pipe comprises fluidly disconnecting the second end of the flexible pipe from the first fluid inlet of the first frac tree.

14. The method of claim 12, wherein attaching the flexible pipe to the manifold comprises lifting the flexible pipe using a lift point on the outer shell to raise the first end of the outer shell to a flanged connection of the fluid outlet.

15. The method of claim 14, further comprising manipulating the first end to align with a mounting point on the flanged connection.

16. The method of claim 12, further comprising allowing the flexible pipe to drape downward from the outer shell in a downward or upside-down "u" shape.

17. The method of claim 12, the first outer shell comprising a plurality of pipes coupled together with a protective sleeve provided at each connection between each pipe of the plurality of pipes and an adjacent pipe.

* * * * *